SINGLE PICTURE SELECTOR SYSTEM

Original Filed Dec. 11, 1964 3 Sheets-Sheet 1

INVENTORS
ARTURO E. STOSBERG
DONALD A. HORSTKORTA
BY Robert Medrick
ATTORNEY

SINGLE PICTURE SELECTOR SYSTEM

Original Filed Dec. 11, 1964 3 Sheets-Sheet 2

INVENTORS
ARTURO E. STOSBERG
DONALD A. HORSTKORTA
BY Robert Mednick
ATTORNEY

SINGLE PICTURE SELECTOR SYSTEM

Original Filed Dec. 11, 1964 3 Sheets-Sheet 3

INVENTORS
ARTURO E. STOSBERG
DONALD A. HORSTKORTA
BY Robert Medwick
ATTORNEY

United States Patent Office

Re. 28,231
Reissued Nov. 5, 1974

28,231

SINGLE PICTURE SELECTOR SYSTEM

Arturo E. Stosberg, Otelsinger, Switzerland, and Donald A. Horstkorta, Menlo Park, Calif., assignors to Kurt R. Machein, Palo Alto, Calif.

Original No. 3,397,283, dated Aug. 13, 1968, Ser. No. 417,677, Dec. 11, 1964. Application for reissue Feb. 2, 1970, Ser. No. 15,334

Int. Cl. H04m *5/78*

U.S. Cl. 360—35 15 Claims

Matter enclosed in heavy brackets [ ] appears in the original patent but forms no part of this reissue specification; matter printed in italics indicates the additions made by reissue.

ABSTRACT OF THE DISCLOSURE

A system for selecting a single picture signal from a moving picture television signal to be repetitively reproduced and to be immediately substituted for the television signal. This system includes trigger means to enable a single picture signal to be selected from the television signal commencing during one of its blanking intervals after the equalizing pulses thereof, a storage device for repetitively reproducing the single picture signal, and a switch signal generator to produce a signal to enable the storage device to record and then repetitively reproduce the single picture signal which is to be substituted for the television signal, all of which are responsive to the sync pulses of the television signal so that the repetitively reproduced single picture signals are in synchronization with the television signal.

The present invention relates to a single picture selector system for selecting a single picture signal from a multiple picture signal source, and more particularly, this invention relates to a system for recording a single picture signal obtained from a multiple composite picture signal source and then immediately reproducing the recorded single picture signal as long as desired.

A multiple composite television signal is one that contains all the signal information needed to reproduce a series of single picture signals in a television receiver. The multiple composite television signal includes in addition to picture information, horizontal and vertical blanking and synchronization signals. When reproduced in a television receiver, the series of single picture signals form a visually continuous and changing motion picture. In the United States standards of television broadcast transmission, the multiple composite television signal contains 525 horizontal lines occurring at a line scanning frequency of 15,750 cycles per second to develop each single picture frame. In turn, each single picture frame includes two interlacing single picture field which are repeated at the rate of 60 times per second. The picture information signals in alternate single picture fields are displaced at half horizontal line intervals to produce interlacing pictures in the television receiver. Between the single picture information signals of each single picture field, is a vertical blanking signal which contains six equalizing pulses spaced at half horizontal line intervals followed by a serrated vertical synchronization signal, next followed by six additional equalizing pulses, and then followed by several synchronization pulses. The vertical blanking intervals for each single picture field is a small percentage of the field scanning period of 1/60 of a second.

In the video or television art, the term "sync" for brevity purposes is often used for "synchronization," and will also be so used in the following description.

It is at times desirable to select a single picture signal from a multiple composite television picture signal source such as from a television broadcast transmitter, record the single picture signal, and then immediately play it back over and over again as long as desired.

It is therefore an object of this invention to provide a system for selecting a single picture signal from a multiple picture signal source.

Another object of this invention is to provide a system capable of repeatedly selecting single picture signals at desired time intervals from a multiple picture signal source.

Still another object of this invention is to provide a system for selecting a single picture signal from a multiple picture signal source, recording said single picture signal, then immediately continuously reproducing said single picture signal as long as desired.

A further object of this invention is to provide a system for selecting a single picture television signal, recording said single picture signal, and then immediately reproducing the recorded picture signal as long desired, without disturbing the vertical synchronization signal thereof.

A still further object of this invention is to provide a system capable of repeatedly selecting single television picture signals at desired time intervals from a multiple television picture source, recording each single television picture signal, and then immediately reproducing each single television picture signal until the next selected recording thereby preventing noticeable flicker of the reproduced single picture signals when shown on a television receiver.

Still a further object of this invention is to provide a system for selecting a single field of a television picture signal, recording said single field signal, and then immediately reproducing the recorded single field signal to produce a single field picture in a television receiver.

Another object of this invention is to provide a system capable of repeatedly selecting single television picture signals at desired time intervals from a multiple television picture source, recording each single television picture signal and at the same time erasing a previous recorded signal just prior to recording said single television picture signal, and then immediately reproducing each single television picture signal.

The novel features which are belived to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
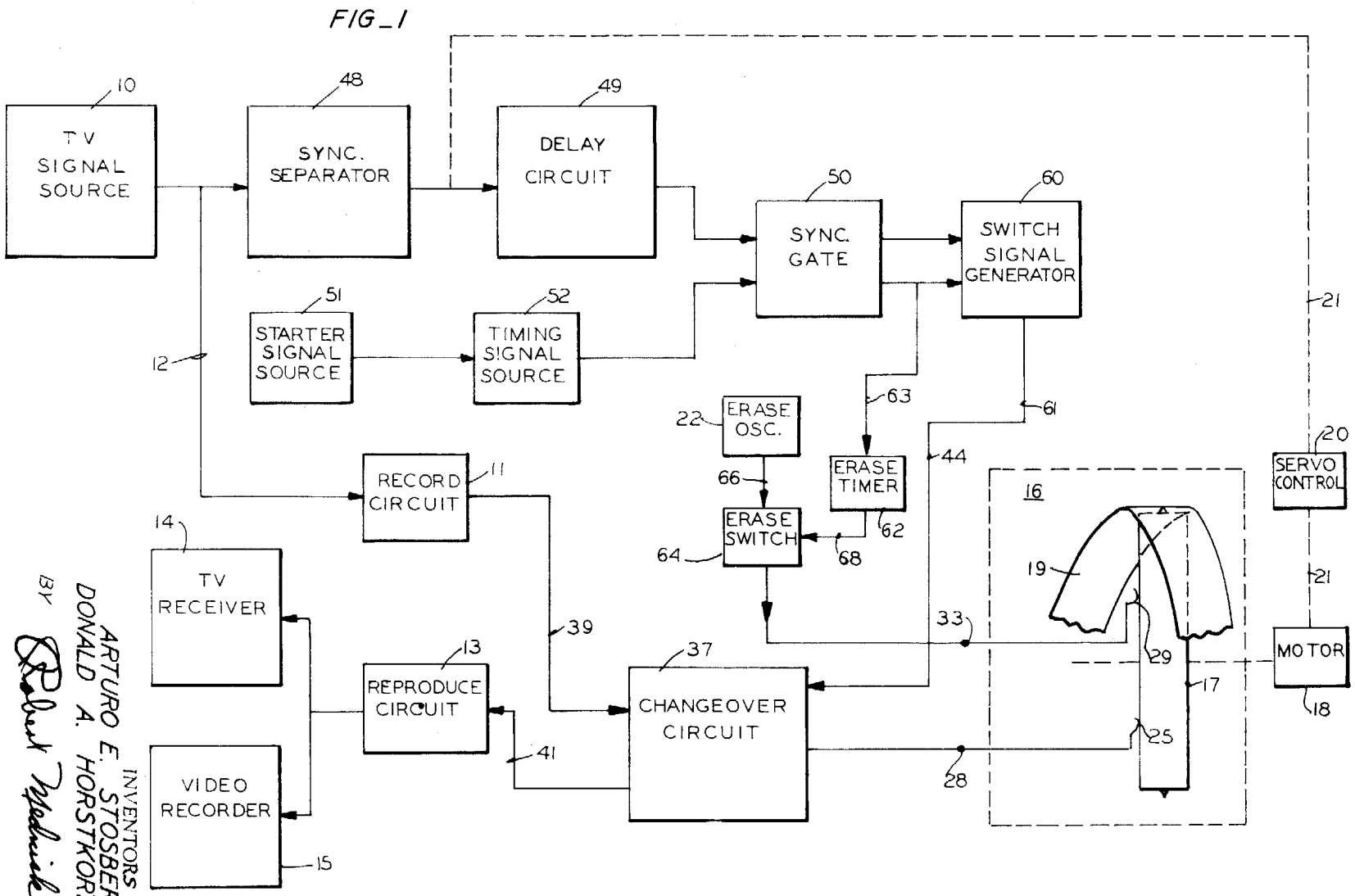
FIG. 1 is a block diagram schematically illustrating a system incorporating the present invention.
Figure 3A:
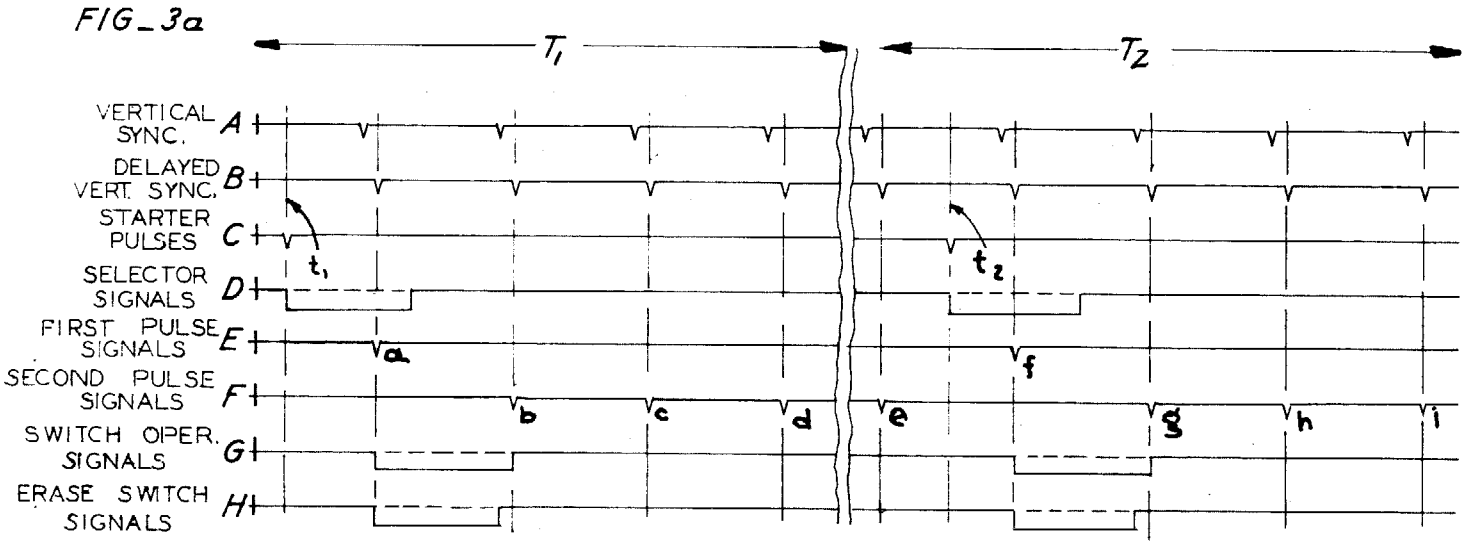

FIG. 3*a* shows a series of waveforms at various points in the system seen in FIG. 1 at two time periods and illustrating its operation when single fields of a television signal are selected for recording and reproduction.

Figure 3B:
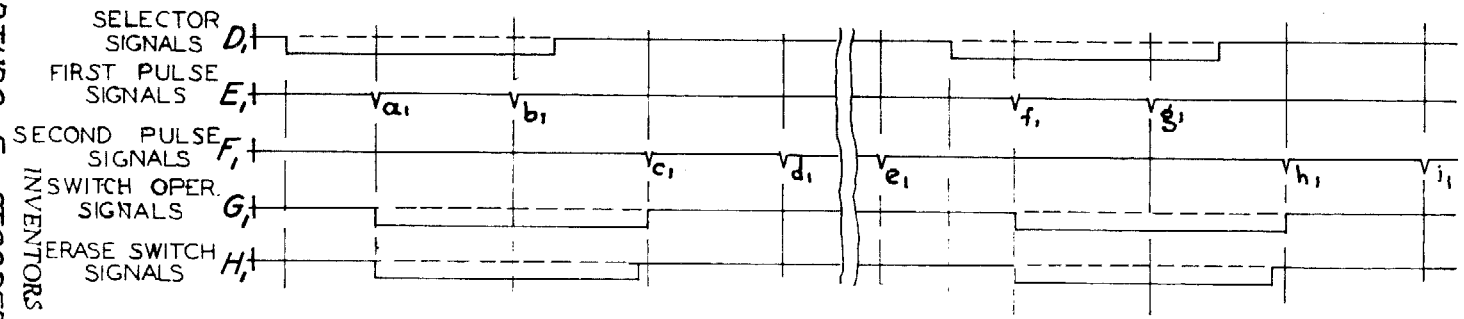

FIG. 3*b* shows a series of waveforms at various points in the system seen in FIG. 1 at two time periods and illustrating its operation when single frames of a television signal are selected for recording and reproduction.

Figure 4:
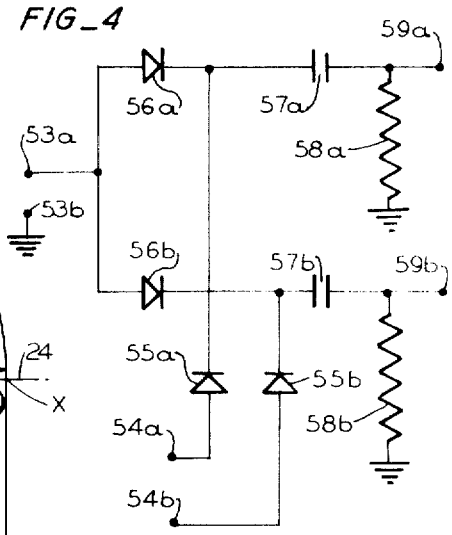

FIG. 4 is a circuit diagram of a sync gate that may be used in the system of this invention for operating the switch signal generator.

Figure 5:
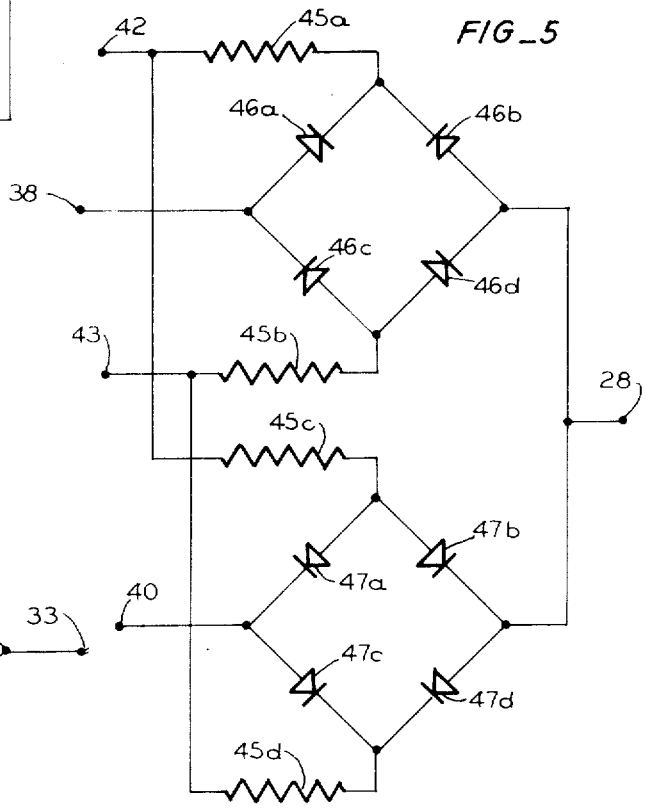

FIG. 5 is a circuit diagram of an electronic changeover circuit which is responsive to the switch operating signals developed in the system of this invention.

Figure 6:
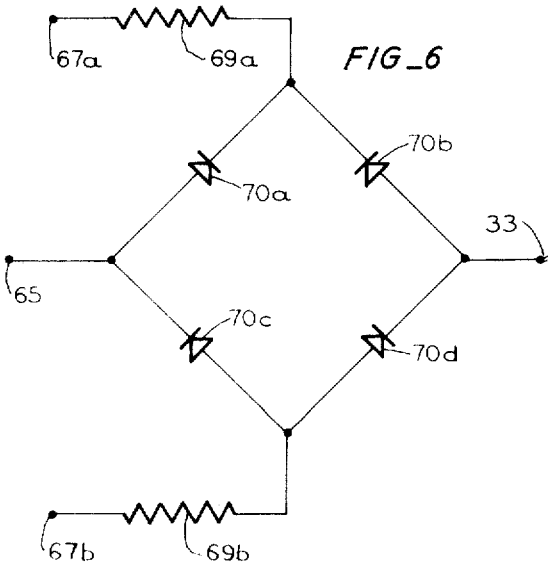

FIG. 6 is a circuit diagram of an erase switch circuit which is responsive to the first pulse signals from the sync gate.

Referring now to the figures, there is shown in FIG. 1 a block diagram schematically illustrating a system incorporating the present invention. Television signal source 10 supplies a television signal to record circuit 11 via line 12 to be suitably amplified and otherwise prepared for recording thereof. Reproduce circuit 13 is capable of receiving a reproduced signal, then amplifying and otherwise suitably preparing the reproduced signal for application to a television receiver or monitor 14 for viewing, or to a video recorder 15 for rerecording if desired. A magnetic storage member 16 includes a rotatable member seen to be a disc or narrow drum 17 which is rotatable by motor 18 and has magnetic heads disposed thereon to traverse a track on magnetic tape 19. A magnetic tape video recorder and associated mechanism which may be used as a magnetic storage member in this system when magnetic tape-used therewith is held stationary is shown in copending patent application of Perry Alan Bygdnes, Ser. No. 241,789, and now abandoned, filed Dec. 3, 1962, entitled "Tape Recorder" and assigned to the same assignee as this invention. A servo control 20 is seen connected to this system by dotted lines 21 and operates to control the speed of drum 17 in synchronization with the field or frame rate of the television signal. A suitable servo control is shown in a copending patent application of Kult R. Machein and Uwe W. Reese, Ser. No. 257,483, now U.S. Patent No. 3,277,236, filed Aug. 15, 1963 entitled "Phase Control System and assigned to the same assignee as this invention. Although a D.C. constant current erase signal may be used, in this embodiment an erase oscillator 22 is provided to produce an A.C. signal suitable for application to an erase head to erase magnetically recorded information. The single picture storage device for recording and reproducing composite television singals includes magnetic storage member 16, record circuit 11, reproduce circuit 13, and erase oscillator 22.

Figure 2:
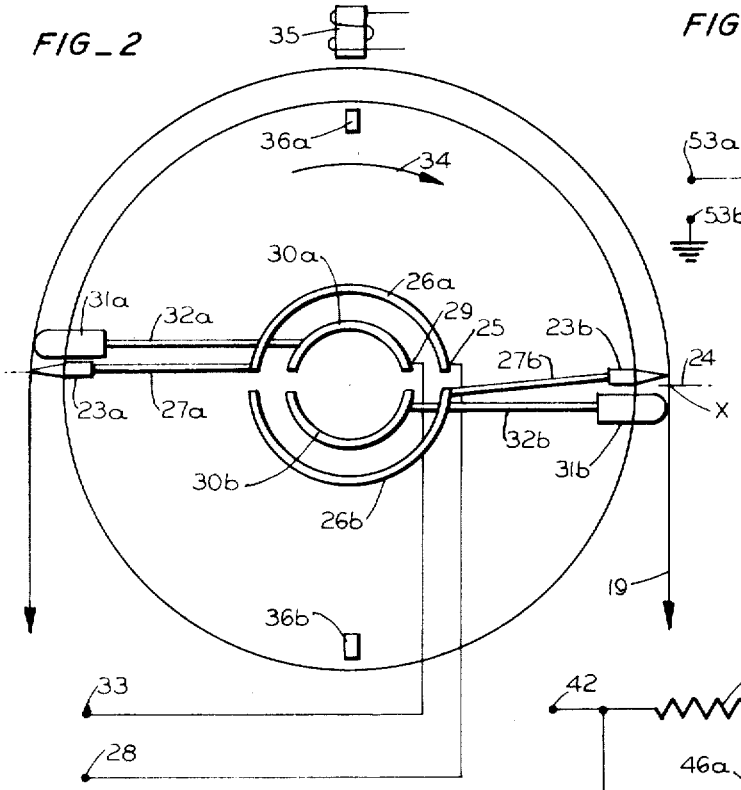
FIG. 2 is a plan view of a magnetic storage member having magnetic heads utilized in the embodiment of the invention shown in FIG. 1.

As seen in more detail in FIG. 2, magnetic storage member 16 includes disc or drum 17 having two magnetic transducer heads 23a and 23b comprising the transducer means, said transducer heads are secured near opposite ends of a diameter 24 of said disc, each transducer head being capable of recording or reproducing a television signal on the magnetic tape 19. A brush 25 contacts a commutator comprising segments 26a and 26b attached to rotate with disc 17. Segments 26a is connected to transducer head 23a via line 2a segment 26b is connected to transducer head 23a via line 27b. As disc 17 is rotated, brush 25 alternately connects transducer heads 23a and 23b to terminal 28 when brush alternately contacts segments 26a and 26a respectively. Another brush 29 contacts another commutator comprising segments 30a and 30b attached to rotate with disc 17. Segment 30a connects to erase head 31a via line 32a segment 30b connects to erase head via line 32b. These erase heads are thereby similarly alternately connected to terminal 33. Erase heads 31a and 31b are seen to be positioned slightly ahead of transducer heads 29a and 23b respectively, in the direction of rotation of disc 17 shown by arrow 34. FIG. 2 also shows a pulse pick up coil 35 positioned adjacent to disc 17, and a pair of permanent magnets 36a and 36b attached to one surface of the drum at opposite ends of a diameter thereof. When the magnets pass the pick up coil 35 a positioning pulse is induced in the coil, these pulses are utilized in said servo control 20 to synchronize the rotation of disc 17 with the field or frame rate of the television signal.

In a magnetic tape video recorder for recording and reproducing a program of television pictures, or in a single picture recorder for recording and reproducing single video pictures, a mechanical switch is usually used to changeover the operating mode of the recorder from record to reproduce, or vice versa. In the embodiment of this invention, an electronic changeover ciruit 37 is used which functions to effectively open and short circuits in order to enable the quick changeover desired of for example approximately five microseconds. Referring now also to FIG. 5 there is seen a circuit diagram of a bridge changeover circuit used in the system of this invention. It is seen that changeover circuit 16 includes a pair of bridge gates or switches. Terminal 28 therein connects to brush 25 as previously described. Terminal 38 connects via line 39 to record circuit 11; and terminal 40 connects via line 41 to reproduce circuit 13. Terminals 42 and 43 connect to line 44 to receive a switch operating signal. Voltage dropping resistors 45a, 45b, 45c, and 45d are provided to reduce the voltages from the switch operating signal to a desired level for the bridge circuits. The record switch includes diodes 46a, 46b, 46c, and 46d which when terminal 42 is negative with respect to terminal 43 will conduct in their low resistive path and thereby allow record signal from terminal 38 to pass through the record bridge circuit to terminal 28. At the same time diodes 47a, 47b, 47c and 47d of the reproduce switch will appear as high resistances and virtually open-circuit or block passage of any signal from terminal 28 to terminal 40. On the other hand, when terminal 42 is positive with respect to terminal 43, said record bridge switch will be virtually open-circuited and the reproduce bridge switch will be effectively closed, thereby reproduce signals from terminal 28 will be allowed to pass therethrough to terminal 40.

Referring now again to FIG. 1, the multiple composite television signal from television signal source 10 is also applied to sync stripper or separator circuit 48 to provide 60 cycles vertical synchronizing pulses. Said separator circuit 48 may include conventional clipper stages followed by an integrating network and a pulse shaper to produce sharp pulses at the field repetition rate as seen in waveform A of FIG. 3a. It is desired to postpone the operation of the subsequent changeover from reproduce to record and vice versa in the following described single picture recorder/reproducer storage device, so that the vertical sync signal from television signal source 10 is not disturbed as to cause loss of vertical synchronization and result in picture rolling when viewed on a television receiver. For this reason, the shaped separated synchronization pulses A are delayed by delay circuit 49 to a desired point beyond the equalizing pulses following the vertical sync signal in the composite television signal but within the vertical blanking period. The output of delay circuit 49 is seen as waveform B in FIG. 3a and is applied to sync gate 50.

In order to initiate the recording of a single picture selected from the multiple series of television picture signals from television signal source 10, a starter signal source or starter 51 is provided. For some uses, starter signal source 51 may provide a series of short trigger pulses at predetermined time intervals. In this illustrated embodiment, a simplified version is seen to be provided wherein starter signal source 51 produces starting trigger pulses at times $t_1$ and $t_2$ during separated time periods $T_1$ and $T_2$ as seen in waveform C of FIG. 3a. For this purpose, starting pulses $t_1$ and $t_2$ may be produced for example by utilizing a mechanical switch in an RC circuit to allow a charged capacitor to discharge into a load resistor to produce trigger starting pulses $t_1$ and $t_2$.

These starting pulses are applied to a timing signal source 52 to initiate selector signals seen in waveform D of FIG. 3a having a duration of the vertical sync period. Timing signal source 52 may be a conventional monostable or one-shot multivibrator circuit which goes through a complete cycle of operation for each received trigger pulse, and then remains quiescent until another trigger pulse is applied. The leading edges of the selector signals D are triggered by starting pulses $t_1$ and $t_2$; the duration of said selector signals are determined by the time constants of the one-shot multivibrator circuit. It will be ntoed that starting pulses $t_1$ and $t_2$ will occur sometime between the vertical sync pulses developed from the television signal source 10 as they are not timed to occur simultaneously therewith. Selector signals D are then also applied to sync gate 50.

Referring now also to FIG. 4, the sync gate circuit is seen to include terminals 53a and 53b for receiving delayed vertical sync pulses B from delay circuit 49, and terminals 54a and 54b for receiving selector signals D from timing signal source 52. During the existence of selector signals D seen as waveform D of FIG. 3*a*, terminal 54a becomes sufficiently negative in polarity to prevent conduction in diode 55a, whereas the polarity of diode 55b becomes more positive allowing conduction therethrough. As a result, the vertical sync pulses bypassing through diode 56a continue on through coupling capacitor 57 to be developed across load resistor 58a and available at terminal 59a. At the same time, the vertical sync pulses B passing through diode 56b are effectively shorted by conducting diode 55b. Thereupon a first pulse signal E is available at terminal 59a containing the sync pulses occurring during the existence of selector signals D. On the other hand, when the square wave of selector signals D are terminated, then terminal 54a becomes relatively positive to allow conduction in diode 55a, and relatively negative to prevent conduction in diode 55b. As a result, the vertical sync pulses B pass through diode 56b and continue on through coupling capacitor 57b to be developed across load resistor 58b and is available at terminal 59b. At the same time, the vertical sync pulses B passing through diode 56a are effectively shorted by conducting diode 55a. Thereupon a second pulse signal F is available at terminal 59b containing all the other sync pulses applied to terminal 53a.

The first and second pulse signals E and F are applied to switch signal generator 60 which comprises a conventional bistable multivibrator circuit. As is well known, a bistable multivibrator is a two stage direct coupled amplifier with the output of the second stage feeding back to the input of the first stage. By the use of applied trigger pulses each stage can be made to be alternately cutoff and conductive. The sync pulses of the first pulse signal from terminal 59a are applied to the first stage of the bistable multivibrator circuit and are capable of triggering it into conduction; the sync pulses of the second pulse signal from terminal 59b are applied to the other stage of the bistable multivibrator circuit and are capable of triggering it into conduction. Pulses a and f of first pulse signal E will trigger said first stage into conduction and initiate switch operating signals G during $T_1$ and $T_2$. Pulses b and g of second pulse signal F will trigger said other stage into conduction and terminate switch operating signals G during $T_1$ and $T_2$. Pulses c, d, e, h, and i are not operative to rechange the operating states of the bistable multivibrator. Accordingly, switch operating signals G in the form of a square wave are developed in output line 61 of switch signal generator 60. Waveforms G are thereby applied to terminals 42 and 43 of changeover circuit 37 to operate it as hereinabove described.

As seen in FIG. 1, erase oscillator 22 is provided to produce a suitable erase signal which is applied to erase switch 62. First pulse signals E derived from terminal 59a of sync gate 50 are also applied to erase timer 62 via line 63. Erase timer 62 includes a conventional monostable or one-shot multivibrator circuit which goes through a complete cycle of operation for each received trigger pulse, and then remains quiescent until another trigger pulse is applied. First pulse signal E thereupon triggers erase timer 62 to start erase switch signals H of FIG. 3*a*. The duration of these erase switch signals H are determined by the time constants of the one-shot multivibrator circuit which is preferably set to terminate at point X of FIG. 2 so that signal erasures will not occur beyond said point X. It will therefore be realized that although switch operating signals G and erase switch sigial H are initiated at the same time, the duration of erase switch signals H is slightly reduced so that it will terminate at about the same position that transducer heads 23a and 23b will be when switch operating signals G terminate. Accordingly, the difference in duration of switch operating signal G and erase switch signals H represents the approximate time it takes for a transducer head to move to its adjoining erase head during the operation of this invention.

Erase switch signals H are applied to erase switch 64, the circuit digram of which is seen in FIG. 6 to be similar to the previously described record switch of changeover circuit 37. Terminal 33 connects to brush 29 as previously described. Terminal 65 connects via line 66 to receive signals from erase oscillator 22. Terminal 67a and 67b connect to erase timer 62 via line 68 to receive erase switch signals H. Voltage dropping resistors 69a and 69b reduce the voltages from the erase switch signals to a desired level. Diodes 70a, 70b, 70c, and 70d will conduct in their low resistive path to allow the erase signal from erase oscillator 22 to pass through the bridge circuit when terminal 67a is negative with respect to terminal 67b. On the other hand, when terminal 67a is positive with respect to terminal 67b, then the diode bridge circuit of erase switch 64 will be effectively closed, preventing passage of an erase signal therethrough.

It was noted that the record switch of changeover circuit 37 and the erase circuit 64 are simultaneously operated to pass signals therethrough. Any record signal will change the magnetic state of the magnetic material on magnetic tape in accordance with said record signal. Consequently, recordation will necessarily cause erasure of any previously recorded signal on such magnetic tape. However, such erasure is not as complete as that produced by a specially designed erase signal and an erase head. The incomplete erasure would be objectionable during the signal information portion of the single picture signal. For this reason, erase heads 31a and 31b are positioned close to transducer heads 23a and 23b respectively, so that the erase operation is commenced during the vertical sync period and prior to the commencement of the picture information signal of the composite television signal.

In considering the operation of the single picture selector system of this invention, first, let us assume it is desired to record a single field of a composite television signal. Drum 17 is roated by motor 18 at a speed whereby one-half revolution thereof occurs during the period of a desired picture signal. In standard television broadcast, the composite television signal includes picture information signals which are alternately displaced at half line intervals. After recording a single field picture of such a televisional signal, it is desirable to reproduce the single field picture without disturbing the horizontal synchronization of the reproduced picture in the television receiver. For this purpose as seen in FIG. 2, head 23b is displaced from diameter line 24 of head 23a at a distance corresponding in time to one half horizontal synchronization interval. Accordingly, during reproduction of a recorded signal, transducer head 23b will pick up the recorded information delayed by one-half horizontal sync interval. Or putting it another way, transducer head 23a will pick up the recorded information advanced by one half horizontal sync interval with respect to the picked up signal by transducer head 23b. Consequently, the single field picture signal will be reproduced in the television receiver without loss of horizontal synchronization, as the alternate single field picture signals will be time displaced by half horizontal sync intervals.

The multiple composite television signal from television signal source 10 is applied to sync separator 48 and also to record circuit 11 via line 12. Sync pulses produced by sync separator 48 from the vertical sync signal of the composite television signal as seen in waveform A of FIG. 3a is applied to servo control 20 to synchronize the speed of drum 17 in accordance therewith. Record circuit 11 prepares the composite television signal for recordation thereof and applies the record television signal via line 39 to changeover circuit 37. Now whenever the operating signals applied to terminals 42 and 43 are of a relative polarity as hereinbefore described to permit conduction of diodes 46a, 46b, 46c, and 46d, then the output of record circuit 11 will pass through the bridge changeover circuit 37 to be applied via brush 25 to either transducer head 23a or 23b depending upon which head is in position to traverse tape 19. At the same time erase switch 64 will be operative to erase any recorded signal on tape 19 just prior to recordation of the applied television signal. On the other hand, if the signals applied to terminals 42 and 43 are of opposite polarity, then diodes 47a, 47b, 47c, and 47d will conduct allowing the reproduce signal derived from brush 25 to pass through bridge changeover circuit 37 to be applied to reproduce circuit 13 and is then available for viewing by television receiver 14 or recording by video recorder 15. At the same time, erase switch prevents any erasure signal from being applied to brush 29. Changeover circuit 37 is interposed between the record and reproduce circuits of the single picture storage device and the transducer heads thereof to alternately connect one or the other circuits thereto. Changeover circuit 37 therefore provides record and reproduce switches which are alternately opened and closed respectively.

Now let us examine the means for producing the switch operating signal which is applied via line 61 to aforesaid terminals 42 and 43 to operate the record and reproduce switches. First, it is seen that the vertical sync pulses from sync separator 48 is also applied to delay circuit 49. The output of delay circuit 49 is seen as waveform B and sufficient delay is introduced so that the switching operation will not occur during the vertical sync signal and thereby affect vertical synchronization. Sync separator 48 and delay circuit 49 therefore is the operating sync pulse supply means for sync gate 50. Also applied to sync gate 50 are selector signals developed by the timing signal source which is seen to be initiated by starter signal source 51. Starter 51 is seen in FIG. 3a to produce starting pulses C at $t_1$ and $t_2$ thereby initiating the square wave selector signals D each having the duration of a single field (in this example of operation) of a multiple television signal.

Sync gate 50 receives both the vertical sync signals B from delay circuit 49 and the selector signals D from timing signal source 52, and produces a first pulse signal E including the vertical sync pulses B occurring during selector signals D, and also produces a second pulse signal F including all the other vertical snyc pulses. Accordingly, the described sync pulse supply means, timing signal source and the snyc gate make up the trigger pulse means for actuating switch signal generator 60.

The bistable multivibrator of switch signal generator 60 is actauated by signals E and F to provide switch operating signals G. It will be noted that signals G are in effect specially timed switching or gating operating signals developed from the vertical sync signal of the multiple composite television signal and which start within the vertical blanking period and eixst for the desired single picture interval after selected times $t_1$ and $t_2$.

Changeover circuit 37 receives switch operating signals G via line 44 to allow passage therethrough between record circuit 11 and brush 25 during the existence of switch operating signals G. At all other times, changeover circuit 37 only allows passage therethrough between reproduce circuit 13 and brush 25. Erase switch 64 is operative to pass an erase signal only when the record signal from record circuit 11 passes through bridge changeover circuit 37. Accordingly, for the above described operation, whenever a starting pulse is initiated, then the next single picture television field will be recorded on the single picture storage device, and at the same time the previously recorded signal will be erased. At all other times, the single picture storage device will operate to reproduce the single picture television field recorded thereon.

Although in the above description for the purpose of illustrated, it was assumed that single fields of a multiple composite television signal were to be selectively recorded and reproduced, it will be realized that single television picture signals of any duration can be so handled by the system of this invention. For example, if complete frames (including two fields) of such a multiple composite television signal were to be recorded and reproduced, then the speed of drum 17 would be half that for single field recording when utilizing the same storage device, and the period of the one-shot multivibrator in timing signal source 52 would be doubled. Since transducer head displacement is not now necessary to produce interlace scanning, transducer heads 23a and 23b will be aligned at opopsite ends of a diameter of drum 17. For starting pulses initiated at the same time $t_1$ and $t_2$ during separated time period $T_1$ and $T_2$ and for the same vertical sync signals A of FIG. 3a, the selector signals $D_1$ would then be developed by timing signal source 52 as seen in FIG. 3b. Sync gate 50 will now produce first and second pulse signals $E_1$ and $F_1$. Each of the stages of the bistable multivibrator of switch signal generator 60 will be triggered into conduction by the first occurring pulse of the pulse signals applied thereto. Pulses $a_1$ and $f_1$ of first pulse signal $E_1$ will trigger the first stage of the bistable multivibrator of switch signal generator 60 into conduction and thereby initiate switch operating signals $G_1$ during $T_1$ and $T_2$. Pulse $c_1$ and $h_1$ will trigger said other stage into conduction and terminate switch operating signals $G_1$ during $T_1$ and $T_2$. Pulses $b_1$, $d_1$, $e_1$, $g_1$ and $i_1$ are not operative to rechange the operating state of the bistable multivibrator. Switch operating signals $G_1$ are thereupon produced. As the duration of $G_1$ is double that of G of FIG. 3a, record circuit 11 will be connected to brush 25 for the duration of single picture frames of the selected single composite television signals. Similarly, erase switch signals will also be modified as seen in $H_1$ of FIG. 3b to operate as before described.

From the above description, it will also be realized that this system could be used to selectively record and reproduce single television picture signals of durations other than that of standard television broadcast characteristics. For example, closed circuit television systems produce composite multiple television signals with different single picture signal intervals. In the system of this invention utilized with these closed circuit television systems, the duration of the aforedescribed selector signals would be adjusted to correspond to the vertical sync rate of these other multiple composite television signals.

Having herein described the invention, what is claimed as new is:

1. An electronic system wherein a single composite television signal is recorded and reproduced and which is selected from a multiple composite television signal having vertical sync signals, said electronic system comprising: a sync pulse supply means to receive the multiple television signal and develop delayed vertical sync pulses from the vertical sync signals to occur during the blanking intervals and after the equalizing pulses thereof; a timing signal source to provide a selector signal initiated at any selected time; a sync gate connected to said sync pulses supply means and to said timing signal source to provide a first pulse signal including the delayed sync pulses from said sync pulse supply means occurring during the selector signal, and to provide a second pulse signal including all the other delayed sync pulses from sync pulse supply means; a switch signal generator connected to said sync gate for developing a switch operating signal initiated by the first delayed sync pulse of said first pulse signal during said selector signal and terminated by the next occurring delayed sync pulse of said second pulse signal; a storage device for recording and reproducing signal composite television pictures and including a record circuit, a reproduce circuit, and transducer means, said storage device having a rotatable drum being responsive to the vertical sync signals of the multiple television signal to be rotated in synchronization therewith; and an electronic changeover circuit connected to said switch signal generator and to said storage device and including a record switch connected between the record circuit and the transducer means to allow the passage therebetween only during the switch operating signal, and including a reproduce switch connected between the reproduce circuit and the transducer means to allow the passage therebetween at all other times.

2. The system in accordance with claim 1 wherein said transducer means includes a pair of transducer heads connected to be alternately operatively in said storage device.

3. The system in accordance with claim 2 which additionally includes erase means connected to said storage device and connected to receive the switch operating signal to apply an erase signal to said storage device for a selected duration of the switch operating signal.

4. The system in accordance with claim 2 wherein said transducer heads are positioned to alternately time displace the reproduced television signal to correspond with the horizontal sync rate of the composite television signal.

5. An electronic system for selecting a single picture signal from a television signal source, said system comprising: a television signal source for producing a multiple composite television signal with vertical blanking periods including vertical sync signals and equalizing pulses; a sync separator connected to the television signal source to receive the multiple composite television signal and develop vertical sync pulses from the vertical sync signals; a delay circuit connected to the sync separator to produce vertical sync pulses delayed to occur after the equalizing pulses of their respective vertical blanking periods; a timing signal source to provide a selector signal initiated at any selected time; a sync gate connected to said delay circuit and to said timing signal source to provide a first pulse signal including the sync pulses from said delay circuit occurring during the selector signal, and to provide a second pulse signal including all the other sync pulses from said delay circuit; a switch signal generator connected to said sync gate for developing a switch operating signal initiated by the first sync pulse of said first pulse signal during said selector signal and terminated by the next occurring sync pulse of said second pulse signal; a storage device for recording and reproducing single composite television pictures and including a record circuit, a reproduce circuit, and transducer means, said storage device being connected to receive the television signal from the television signal source, and having a rotatable drum driven in synchronization therewith; and an electronic changeover circuit connected to said switch signal generator and to said storage device and including a record switch connected between the record circuit and the transducer means to allow the passage therebetween only during the switch operating signal, and including a reproduce switch connected between the reproduce circuit and the transducer means to allow the passage therebetween at all other times.

6. An electronic system wherein a single composite television signal is recorded and reproduced and which is selected from a multiple composite television signal with vertical blanking periods including vertical sync signals and equalizing pulses, said electronic system comprising: a sync pulse supply means to receive the multiple television signal and develop from the vertical sync signals vertical sync pulses delayed to occur during their respective blanking periods and after the equalizing pulses therein; a timing signal source to provide a selector signal initiated at any selected time; a sync gate connected to said sync pulse supply means and to said timing signal source to provide a first pulse signal including the sync pulses from said sync pulse supply means occurring during the selector signal, and to provide a second pulse signal including all the other sync pulses from said sync pulse supply means; a switch signal generator connected to said sync gate for developing a switch operating signal initiated by the first sync pulse of said first pulse signal during said selector signal and terminated by the next occurring sync pulse of said second pulse signal; a storage device for recording and reproducing single composite television pictures and including a record bridge circuit, a reproduce bridge circuit, and transducer means, said storage device having a rotatable member being responsive to the vertical sync signals of the multiple television signal to be rotated in synchronization therewith; and an electronic changeover circuit connected to said switch signal generator and to said storage device and including a record bridge switch connected between the record circuit and the transducer means to allow the passage therebetween only during the switch operating signal, and including a reproduce bridge switch connected between the reproduce circuit and the transducer means to allow the passage therebetween at all other times.

7. An electronic system wherein a single composite television signal is recorded and reproduced and which is selected from a multiple composite television signal with vertical blanking periods including vertical sync signals and equalizing pulses, said electronic system comprising: trigger pulse means for receiving the vertical sync signals of the multiple composite television signal and developing a first pulse signal including vertical sync pulses occuring after any selected time for the duration of a composite single television signal, and for developing a second pulse signal including all the other vertical sync pulses, all of said vertical pulses being delayed to occur during their respective vertical blanking periods and after the equalizing pulses thereof; a switch signal generator connected to said trigger pulse means for developing a switch operating signal initiated by the first sync pulse of said first pulse signal occurring after said selected time and terminated by the next occurring sync pulse of said second pulse signal; a storage device for recording and reproducing single composite television pictures and including a record circuit, a reproduce circuit, and transducer means, said storage device having a rotatable member being responsive to the vertical sync signals of the multiple television signal to be rotated in synchronization therewith; and an electronic changeover circuit connected to said switch signal generator and to said storage device and including a record switch connected between the record circuit and the transducer means to allow the passage therebetween only during the switch operating signal, and including a reproduce switch connected between the reproduce circuit and the transducer means to allow the passage therebetween at all other times.

8. The system in accordance with claim 7 wherein said transducer means includes a pair of transducer heads connected to be alternately operative in said storage device.

9. The system in accordance with claim 8 which additionally includes erase means connected to said storage device and connected to receive the switch operating signal to apply an erase signal to said storage device for a selected duration of the switch operating signal.

10. The system in accordance with claim 8 wherein said transducer heads are positioned to alternately time displace the reproduced television signal to correspond with the horizontal sync rate of the composite television signal.

11. A system for substituting a repetitively reproduced single picture signal from a moving picture television signal with vertical blanking periods including vertical sync signals and equalizing pulses, said system comprising: a sync supply means to receive the television signal and develop delayed vertical sync pulses therefrom to occur during the blanking intervals and after the equalizing pulses thereof; a timing signal source to provide a selector signal initiated at any selected time; a switch signal generator connected to the sync pulse supply means and to the timing signal source for developing a switch operating signal initiated by both the selectior signal and by a delayed vertical sync pulse, and being thereafter terminated at any desired integer field multiple of the television signal; a storage device connected to the switch signal generator and capable of receiving the television signal to record the next occurring single picture signal during the switch operating signal, and then repetitively reproducing this single picture signal, said storage device having a rotatable member being responsive to the vertical sync signals of the multiple television signal to be rotated in synchronization therewith; and an electronic changeover circuit connected to the switch signal generator and the storage device to allow the [repetitive single picture] *moving picture television* signal to pass therethrough *to said storage device* during the switch operating signal, and being connectable to receive the [moving picture television] *repetitive single* signal to allow it to pass therethrough at all other times.

12. A system for selecting a single picture signal from a television signal source, said system comprising a television signal source for producing a television signal with vertical blanking periods including vertical sync signals and equalizing pulses; a sync pulse supply means to receive the television signal and develop delayed vertical sync pulses therefrom to occur during the blanking intervals and after the equalizing pulses thereof; a timing signal source to provide a selector signal initiated at any selected time; a switch signal generator connected to the sync pulse supply means and to the timing signal source for developing a switch operating signal initiated by both the selector signal and by a delayed vertical sync pulse, and being thereafter terminated at any desired integer field multiple of the television signal; a storage device connected to the switch signal generator and capable of receiving the television signal to record the next occurring single picture signal during the switch operating signal, and then repetitively reproducing this single picture signal, said storage device having a rotatable member being responsive to the vertical sync signals of the multiple television signal to be rotated in synchronization therewith; and an electronic changeover circuit connected to the switch signal generator and the storage device to allow the [repetitive single picture] *moving picture television* signal to pass therethrough *to said storage device* during the switch operating signal, and being connectable to receive the [moving picture television] *repetitive single* signal to allow it to pass therethrough at all other times.

13. A system for substituting a repetitively reproduced single picture signal from a moving picture television signal with vertical blanking periods including vertical sync signals and equalizing pulses, said system comprising: a trigger pulse means to receive the television signal and develop therefrom delayed sync pulses to occur during the blanking intervals and after the equalizing pulses thereof, and to develop a selector signal initiated at any selected time; a switch signal generator connected to the trigger pulse means for developing a switch operating signal initiated by both the selector signal and by a delayed vertical sync pulse, and being thereafter terminated at any desired integer field multiple of the television signal; and storage device connected to the switch signal generator and capable of receiving the television signal to record the next occurring single picture signal during the switch operating signal, and then repetitively reproducing this single picture signal, said storage device having a rotatable member being responsive to the vertical sync signals of the multiple television signal to be rotated in synchronization therewith; and an electronic changeover circuit connected to the switch signal generator and the storage device to allow the [repetitive single picture] *moving picture television* signal to pass therethrough *to said storage device* during the switch operating signal, and being connectable to receive the [moving picture television] *repetitive single* signal to allow it to pass therethrough at all other times.

14. A system for selecting a single picture signal from a television signal source, said system comprising: a television signal source for producing a television signal with vertical blanking periods including vertical sync signals and equalizing pulses; a trigger pulse means to receive the television signal and develop therefrom delayed sync pulses to occur during the blanking intervals and after the equalizing pulses thereof, and to develop a selector signal initiated at any selected time; a switch signal generator connected to the trigger pulse means for developing a switch operating signal initiated by both the selector signal and by a delayed vertical sync pulse, and being thereafter terminated at any desired integer field multiple of the television signal; a storage device connected to the switch signal generator and capable of receiving the television signal to record the next occurring single picture signal during the switch operating signal, and then repetitively reproducing this single picture signal, said storage device having a rotatable member being responsive to the vertical sync signals of the television signal to be rotated in synchronization therewith; and an electronic changeover circuit connected to the switch signal generator and the storage device to allow the [repetitive single picture] *moving picture television* signal to pass therethrough *to said storage device* during the switch operating signal, and being connectable to receive the [moving picture television] *repetitive single* signal to allow it to pass therethrough at all other times.

*15. A system for repetitiously reproducing one or more selected consecutive single picture signals from a moving picture television signal, said system comprising:*

*trigger pulse means responsive to said moving picture television signal and operative to develop trigger signals commensurate with the sync signals separating consecutive single picture signals;*

*means for providing a selector signal, which is unrelated to said trigger signals, during the time interval between the two trigger signals immediately preceding the occurrence of the first of the selected single picture signals;*

*switch signal generator means responsive to said trigger signals and said selector signal and operative to initiate a switch operating signal upon occurrence of a trigger signal in the presence of said selector signal and to terminate said switch operating signal upon the occurrence of the trigger signal immediately following the occurrence of the last of the selected single picture signals;*

*a storage device operable in a record mode and a reproduce mode and including a rotatable storage member which is responsive to and synchronized with the vertical sync signals of the moving picture television signal; and*

*electronic changeover circuit means connected to said storage means to change the operating mode of said storage device between said record mode and said reproduce mode, said circuit means being responsive to said switch operating signal and operative to record the moving picture television signal upon said storage member during the presence of said switch operating signal, thereby recording the selected single picture signals, and to reproduce the recorded single picture signals repetitiously during the absence of said switch operating signal.*

References Cited

The following references, cited by the Examiner, are of record in the patented file of this patent or the original patent.

UNITED STATES PATENTS

| | | | |
|---|---|---|---|
| 3,051,777 | 8/1962 | Lemelson | 178—6.6 A |
| 3,277,236 | 10/1966 | Machein | 178—6.6 A |
| 3,328,521 | 6/1967 | Moskovitz | 178—6.6 |

HOWARD W. BRITTON, Primary Examiner